United States Patent
Wang et al.

(10) Patent No.: US 11,797,577 B2
(45) Date of Patent: Oct. 24, 2023

(54) SMART DATA WAREHOUSE FOR CLOUD-BASED RESERVOIR SIMULATION

(71) Applicant: Landmark Graphics Corporation, Houston, TX (US)

(72) Inventors: Qinghua Wang, Katy, TX (US); Naga Balaji Govindaraju, Houston, TX (US); Hui Dong, Austin, TX (US); Hanife Meftun Erdogan, Houston, TX (US); Dong Li, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 288 days.

(21) Appl. No.: 17/137,203

(22) Filed: Dec. 29, 2020

(65) Prior Publication Data

US 2022/0207059 A1    Jun. 30, 2022

(51) Int. Cl.
*G06F 16/28* (2019.01)
*G06N 20/00* (2019.01)
(Continued)

(52) U.S. Cl.
CPC ........ *G06F 16/285* (2019.01); *G06F 11/3409* (2013.01); *G06F 16/282* (2019.01);
(Continued)

(58) Field of Classification Search
CPC .. G06F 16/285; G06F 11/3409; G06F 16/282; G06F 30/20; G06F 16/287;
(Continued)

(56) References Cited

U.S. PATENT DOCUMENTS

2003/0144990 A1\* 7/2003 Benelisha ............. G06F 16/148
2012/0158389 A1\* 6/2012 Wu ........................ G16C 20/30
703/10

(Continued)

FOREIGN PATENT DOCUMENTS

KR   100654745 B1   12/2006
WO  2016112241 A1   7/2016

OTHER PUBLICATIONS

PCT Application No. PCT/US2020/067550 International Search Report, dated Sep. 8, 2021, 4 pages.
(Continued)

*Primary Examiner* — Alford W Kindred
*Assistant Examiner* — Cecile H Vo
(74) *Attorney, Agent, or Firm* — DELIZIO, PEACOCK, LEWIN & GUERRA

(57) ABSTRACT

An intelligent data management system leverages heterogeneous database technologies and cloud technology to manage data for reservoir simulations across the lifetime of a corresponding energy asset(s) and facilitates access of that data by various consumers despite changing compute platforms and adoption of open source paradigms. The intelligent data management system identifies the various data units that constitute a reservoir simulation output for storage and organization. The intelligent data management system organizes the constituent data units across a file system and object database based on correspondence with different simulation run attributes: project, study, and model. The intelligent data management system also learns to specify or guide configuration of simulation runs.

20 Claims, 10 Drawing Sheets

(51) Int. Cl.
  *G06F 11/34* (2006.01)
  *G06F 18/214* (2023.01)
  *G01V 99/00* (2009.01)
  *E21B 41/00* (2006.01)
  *G06Q 10/00* (2023.01)

(52) U.S. Cl.
  CPC ......... *G06F 18/2148* (2023.01); *G06N 20/00* (2019.01); *G01V 99/005* (2013.01)

(58) Field of Classification Search
  CPC ........ G06F 11/008; G06F 30/25; G06F 30/27; G06F 30/28; G06F 2111/00; G06F 2119/22; G06F 18/2148; G06F 2111/10; G06F 2113/08; G06F 9/455; G06K 9/6257; G06N 20/00; G01V 99/005; E21B 41/00; E21B 2200/22; E21B 2200/20; E21B 15/00; E21B 40/00; E21B 33/00; G06Q 10/04; C09K 8/58; F06Q 30/0202

See application file for complete search history.

(56) References Cited

U.S. PATENT DOCUMENTS

| | | | | |
|---|---|---|---|---|
| 2016/0123120 | A1* | 5/2016 | Al-Zawawi | E21B 43/00 703/10 |
| 2018/0004868 | A1* | 1/2018 | Adam | G06F 9/45558 |
| 2019/0265375 | A1* | 8/2019 | Aqrawi | G01V 1/301 |
| 2020/0012963 | A1* | 1/2020 | Johnston | G06N 20/20 |
| 2020/0059539 | A1* | 2/2020 | Wang | H04L 67/131 |
| 2020/0097864 | A1* | 3/2020 | Gupta | G06Q 50/06 |
| 2020/0160173 | A1* | 5/2020 | Pandey | G01V 99/005 |
| 2020/0202056 | A1* | 6/2020 | Samson | G06F 30/27 |
| 2021/0042633 | A1* | 2/2021 | Maucec | G06F 16/9024 |
| 2021/0133368 | A1* | 5/2021 | Al Shammari | E21B 43/00 |
| 2022/0082719 | A1* | 3/2022 | Biniwale | G01V 99/005 |
| 2022/0164567 | A1* | 5/2022 | Hu | G06V 40/171 |
| 2022/0205354 | A1* | 6/2022 | Chaki | G01V 1/48 |
| 2022/0318465 | A1* | 10/2022 | Gannas | G06F 30/27 |

OTHER PUBLICATIONS

PCT Application No. PCT/US2020/067550 Written Opinion, dated Sep. 8, 2021, 4 pages.

Austria, Jr., "Database System and Applications Developed for Reservoir Modelling and Monitoring of Geothermal Fields in the Philippines", The United Nations University, Corpus ID: 61290986, 2003, pp. 33-74 [Retrieved on Jul. 7, 2021]. Retrieved from the Internet: <URL: https://orkustofnun.is/gogn/unu-gtp-report/UNU-GTP-2003-04.pdf>.

Salman, "Reservoir Simulation Data Management", ResearchGate, May 16, 2017 [Retrieved on Jul. 7, 2021]. Retrieved from the Internet: <URL: https://www.researchgate.net/publication/320518790_Reservoir_Simulation_Data_Management>, 7 pages.

Teixeira, et al., "Machine Learning Models to Support Reservoir Production Optimization", ScienceDirect, IFAC PapersOnLine 52-1, 2019, pp. 498-501 [Retrieved on Jul. 7, 2021]. Retrieved from the Internet: <URL: https://www.sciencedirect.com/science/article/pii/S2405896319301971>.

Garcia, et al., "Enhanced Reservoir Scenarios Management Workflow", Society of Petroleum Engineers, SPE Asia Pacific Oil & Gas Conference and Exhibition, Oct. 16-20, 2010, Brisbane, Australia, 2010, 15 pages.

Gencer, et al., "Data Management in Reservoir Simulation", Society of Petroleum Engineers, SPE Reservoir Simulation Symposium, Feb. 26-28, 2007, Houston, Texas, U.S.A., 9 pages.

Harwell, et al., "Use of a Relational Database on a PC Network for Reservoir Studies", Society of Petroleum Engineers, SPE Computer Applications, vol. 3, Iss. 1, Jan. 1991, 4 pages.

Islam, et al., "Reservoir Simulator—Input/Output", John Wiley & Sons, Inc., Advanced Petroleum Reservoir Simulation: Towards Developing Reservoir Emulators, Second Edition, 2016, pp. 39-84.

Kreule, et al., "RISRES—A State-Of-The-Art Hydrocarbon Resource Database that Works!", Society of Petroleum Engineers, Petroleum Computer Conference, Jun. 2-5, 1996, Dallas, Texas, 14 pages.

Kurc, et al., "A Simulation an Data Analysis System for Large-Scale, Data-Driven Oil Reservoir Simulation Studies", Concurrency and Computation Practice and Experience 17(11), Sep. 2005, pp. 1441-1467.

Noor, et al., "Transitioning a Legacy Reservoir Simulator to Cloud Native Services", International Petroleum Technology Conference, Jan. 13-15, 2020, Dhahran, Kingdom of Saudi Arabia, 2020, 7 pages.

* cited by examiner

SMART DATA WAREHOUSE FOR CLOUD-BASED RESERVOIR SIMULATION

TECHNICAL FIELD

The disclosure generally relates to the field of data handling and machine learning.

BACKGROUND

Reservoir simulations are repeatedly run over the lifetime of an asset (e.g., reservoir and/or field corresponding to the reservoir). Each run of a reservoir simulation operates on input from numerous sources that can change over the asset lifetime which can include the exploration, drilling, and production stages. Both the inputs and outputs correspond to well data, field data, seismic data, geologic data, fluid data, etc. The vast amount of various data is processed in compute intensive and data intensive modeling, such as flow modeling, production modeling, etc. Multiple consumers (e.g., analytics tools, visualization software) consume at least parts of the output produced from a simulation. The data produced continues growing over the asset lifetime to inform subsequent simulations. In addition, historical measurements, hydraulics logs, maintenance logs, simulator configuration, etc. are also maintained to inform simulations and analysis.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to a predictive model in illustrative examples. Embodiments of this disclosure can be also/instead use a classifier(s). In other instances, well-known instruction instances, protocols, structures and techniques have not been shown in detail in order not to obfuscate the description.

Overview

While the scalability and flexibility challenges of reservoir simulation make use of cloud technology attractive, management of the data input to a reservoir simulator and output from the reservoir simulator includes, among others, data retention, access, maintenance, and organization. Each management facet is characterized by the complexity of reservoir simulations: retention over the lifetime of a reservoir(s), access by various analytical tools, maintaining historical data, etc. An intelligent data management system has been designed that leverages heterogeneous database technologies and cloud technology to manage data for reservoir simulations across the lifetime of a corresponding energy asset(s) and facilitates access of that data by various consumers despite changing compute platforms and adoption of open source paradigms. The intelligent data management system identifies attributes of a reservoir model simulation run to create a database representation of the reservoir model and determines the various data units that constitute a reservoir simulation output to classify and store the constituent data units accordingly. The intelligent data management system organizes the constituent data units across a file system and object database based on correspondence with the different simulation run attributes: project, study, and model.

The intelligent data management system also learns to specify or guide either or both of configuration of simulation runs and building of a reservoir model for simulation. The intelligent data management system stores historical information of simulation runs including performance data and configuration data as training data. The intelligent data management system learns how to configure a reservoir simulator based on this historical information. This knowledge gained by the intelligent data management system is captured in a predictive machine learning model trained with configuration data of runs that satisfy a performance condition(s). With respect to model building, the intelligent data management system learns reservoir model building workflows based on selections by users with domain knowledge (e.g., experienced users).

Example Illustrations

Figure 1:
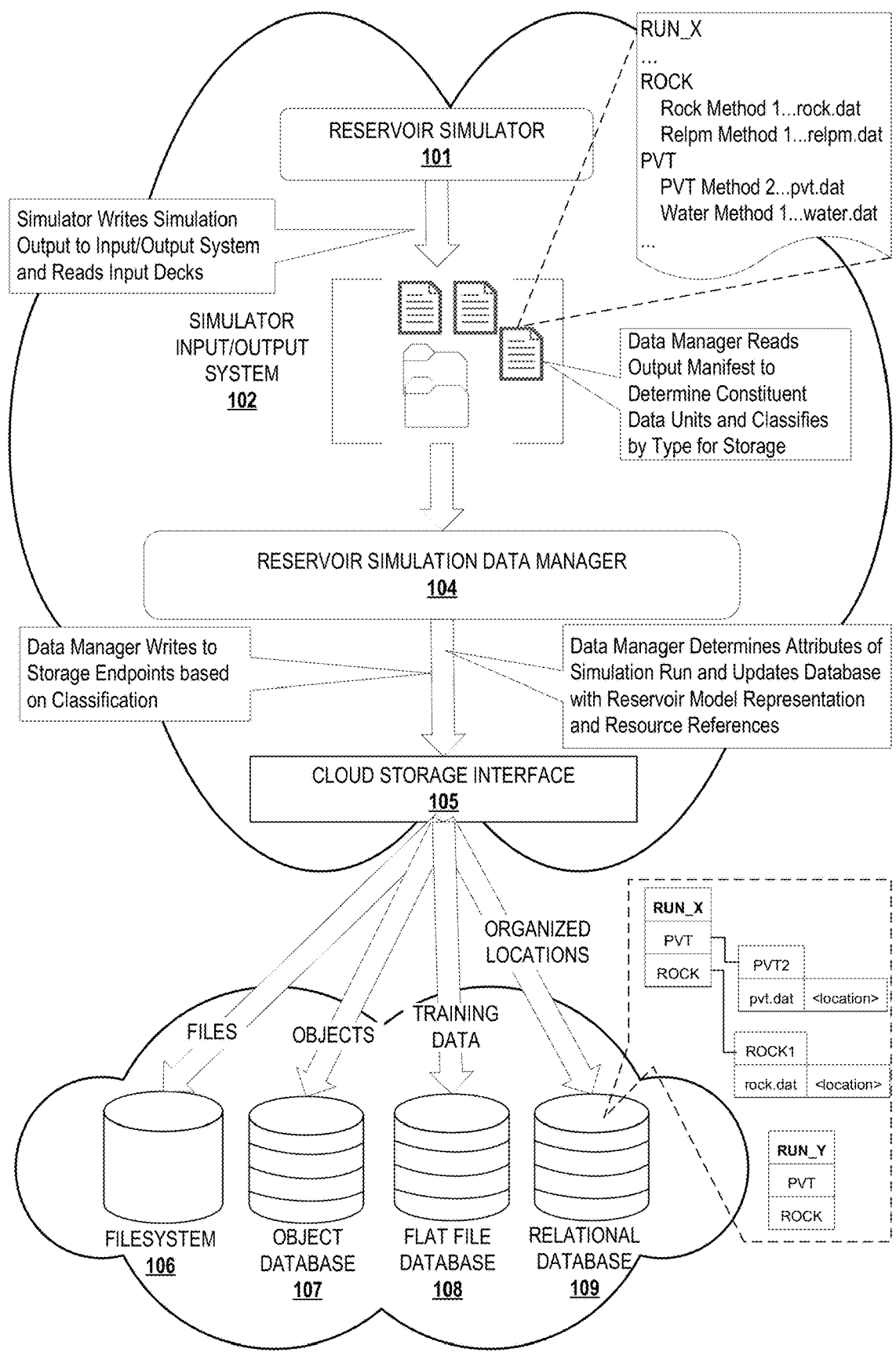
FIG. 1 is a conceptual diagram of a cloud-based data management system that organizes and stores constituent data units output from a reservoir simulation run.

FIG. 1 is a conceptual diagram of a cloud-based data management system that organizes and stores constituent data units output from a reservoir simulation run. FIG. 1 depicts a reservoir simulator 101, a simulator input/output (I/O) system 102, a reservoir simulation data manager 104, and a cloud storage interface 105. The reservoir simulator 101 writes output from a simulation run to the simulation I/O system 102, and reads input decks from the simulator I/O system 102.

The reservoir simulator data manager 104 reads an output manifest that is output by the reservoir simulator 101 for a simulation run. The output manifest identifies the data units that constitute the output and indicates dependencies among the constituent data units. The output includes data units for the reservoir model that was run and predictions or results from the simulation run. The output can also include performance statistics of the simulation run. The reservoir simulator data manager ("data manager") 104 determines the constituent data units of the simulation run and attributes describing the reservoir model corresponding to the simulation run. The data manager 104 creates a representation of the reservoir model in a relational database 109 that will indicate paths or locations of the corresponding constituent data units. The data manager 104 also determines classification of the constituent data units by data unit type to organize the data units. The data manager 104 can read data unit extensions and parse the manifest for keywords that map to data types to classify the constituent data units. For example, an output manifest can identify a collection of data for a case or simulation run RUN_X. The data manager 104 detects the keywords ROCK, PVT, and Method. With these keywords and schematic knowledge of the manifest, the data manager 104 identifies the attributes ROCK and PVT and the child elements for each of these attributes which identify constituent data units and corresponding types. The data collection for RUN_X in this example illustration includes constituent data units for attributes ROCK and PVT. The constituent data units related to the ROCK attribute include a rock.dat file generated based on simulating according to a "method 1" configuration for dynamic modeling of the reservoir rock properties and include a relpm.dat file generated based on simulating according to a "method 1" (e.g., inversion technique) configuration for calculating relative permeability. Based on the classification, the data manager 104 writes the data units to a corresponding storage endpoint via a cloud storage interface 105.

Although depicted as a single cloud storage interface 105, the data manager 104 may access the storage endpoints via different cloud storage interfaces. A cloud storage provider may host the different storage endpoints and provide a single interface (e.g., application programming interface) or single application to access the different endpoints. In other cases, the cloud storage provider may present the different storage endpoints with different interfaces. Furthermore, the data manager 104 can store data across storage endpoints hosted at different cloud storage providers. The data manager 104 stores data units classified as filesystem type data units (e.g., files and folders) into a filesystem 106. The data manager 104 stores data units classified as objects into an object database 107.

Concurrently or subsequently, the data manager 104 updates the relational database 109 with retrieval indications or location information of the files and objects respectively stored into the filesystem 106 and the object database 107. The data manager 104 updates the relational database 109 with the database representation of the reservoir model and the retrieval indications or location information (e.g., a key or index) based on correspondence with different attributes of the simulation run to allow for access at different perspectives or dimensions of simulation runs. This facilitates efficiently building a reservoir model with reuse of different dimensions of simulation runs by attributes. The attributes of a simulation run can at least include project or study, case or scenario, and model. These attributes have a hierarchical relationship. A project refers to a reservoir's rock and fluid properties, and any completion and production history. A case or prediction case refers to rules and/or variables that define constraints for a simulation run, such as production rate and injection schedules. The model attribute refers to properties of the simulation model chosen, such as model size as defined by grid block size and number of grid blocks.

The data manager 104 can use additional or lower granularity attributes of a simulation run to organize constituent data units. For instance, the data manager 104 could use well configuration, rock properties, model, and PVT to represent or describe a reservoir model and as simulation run attributes for organizing constituent data units of a simulation run output.

If the reservoir simulation run qualifies as a source for predictive model training data, then the data manager 104 also captures data about the reservoir simulation run as training data. The data manager 104 stores captured training data into a flat file database 108. In addition, the data manager 104 stores changes to frequently modified files in the flat file database 108. A majority of data units for a reservoir will remain unchanged across simulation runs. When writing a file to the filesystem 106, the data manager 104 can read the file properties to determine frequency of changes to the file. The data manager 104 can be programmed with a file change frequency threshold that triggers storing of file changes into the flat file database 108. Before writing files of a simulation run, the data manager 104 can access the flat file database 108 to determine whether any of the constituent files are indicated as frequently changing. For any file indicated as frequently changing, the data manager 104 can record the change into the flat file database 108 instead of updating the filesystem 106. The filesystem 106 will efficiently handle duplicates (i.e., the filesystem 106 will determine whether a constituent file is already stored in the filesystem 106 and avoid expending resources rewriting the same file). When retrieving data units, the data manager 104 will consult the flat file database 108 to identify frequency changed files and apply indicated changes to the file retrieved from the filesystem 106 prior to writing the file as part of an input deck in the I/O system 102.

Figure 2:
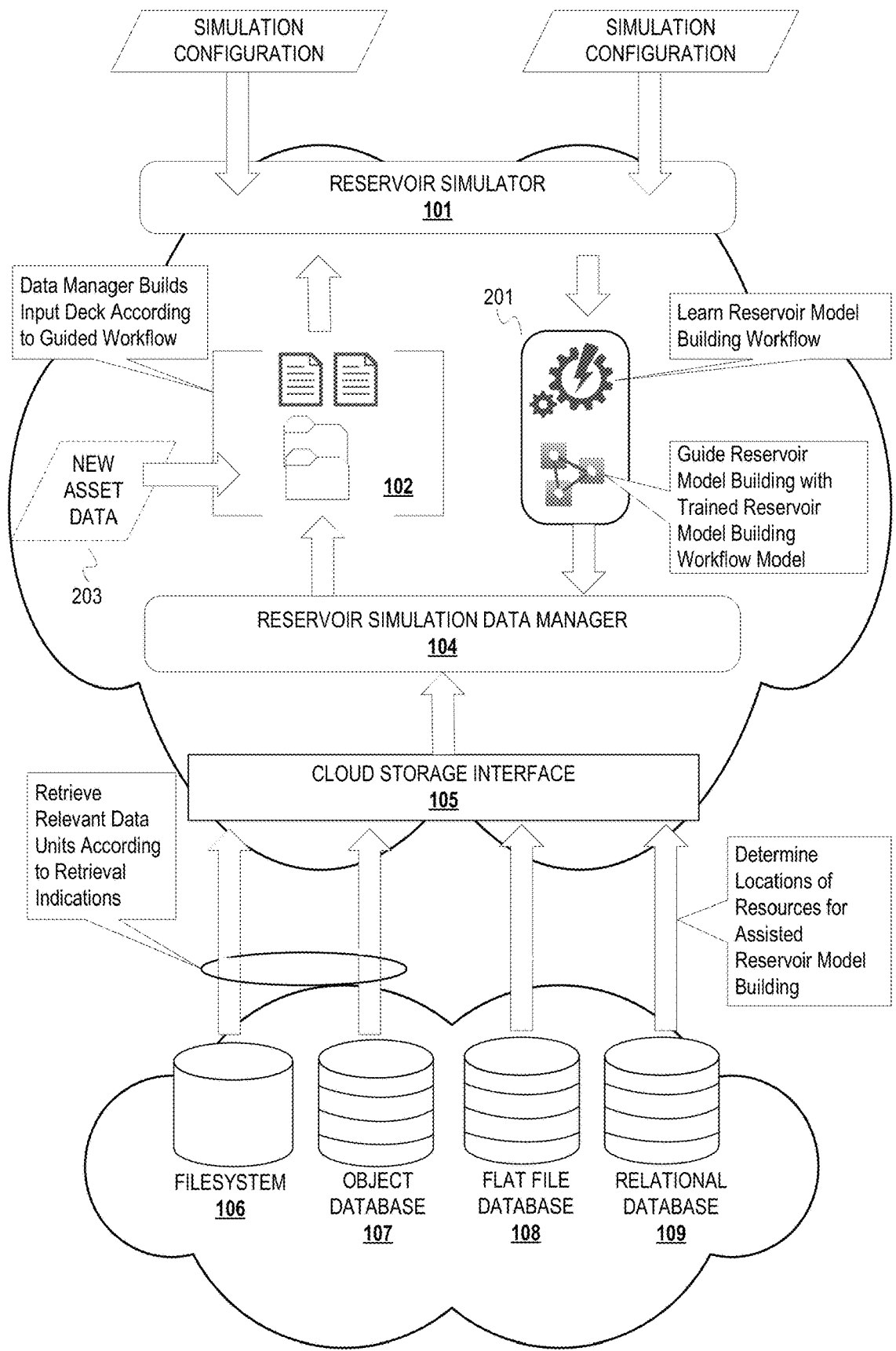
FIG. 2 is a conceptual diagram illustrating a machine learning component integrated or interacting with the reservoir simulation data manager to learn reservoir model building workflows to guide or assist in model building

FIG. 2 is a conceptual diagram illustrating a machine learning component integrated or interacting with the reservoir simulation data manager to learn reservoir model building workflows to guide or assist in model building. A machine learning component 201 is illustrated within a control/data path between the reservoir simulator 101 and the reservoir simulation data manager 104. The machine learning component 201 includes a training algorithm and a trained predictive model. The machine learning component 201 uses the training algorithm for initial and subsequent training of the trained predictive model to learn workflows for building reservoir models ("model building workflows") of simulation runs. The machine learning component 201 selects reservoir simulations that qualify as a source for training data based on domain knowledge of a user that builds a reservoir model. For instance, the machine learning component 201 can communicate with the reservoir simulator 101 or evaluate configuration data of a simulation run to determine whether a user role associated with the simulation run qualifies as an experienced or expert simulator user. FIG. 2 illustrates multiple incoming simulation configurations since the cloud-based reservoir simulator 101 can be used by different users of different teams at different times, and the different users likely have different levels of experience/knowledge with reservoir simulations. Although the machine learning component 201 can perform incremental update training of the predictive model with training data upon determination of qualification, the machine learning component 201 likely stores training data into the flat file database 108 (or another database) and uses the stored training data to further train the predictive model (or a new predictive model) after accumulation of a specified amount of training data.

With the trained predictive model, the reservoir simulator 101 can interact with the data manager 104 and/or machine learning component 201 for guided simulation runs. With an explicit or implicit request for guidance, an incomplete model build/specification can be input into the trained predictive model. Based on the output of the trained predictive model, the data manager 104 accesses the relational database 109 to determine retrieval indications of the relevant data units for the model build. The data manager 104 then retrieves the relevant data units from filesystem 106 and the object database 107 according to the retrieval indications determined from the relational database 109. The data manager 104 then builds an input deck according to the guided model building workflow based on the retrieved relevant data units and user input configurations. The data manager 104 may incorporate new asset data 203 (e.g., new measurements) if specified by the user input configuration.

An incomplete simulation run configuration encompasses varying instances of incomplete. For example, an incomplete simulation configuration can encompass partial configuration, e.g., partial grid selections and/or selection of compositional model for fluid simulation without selection of the compositional model components.

Figure 3:
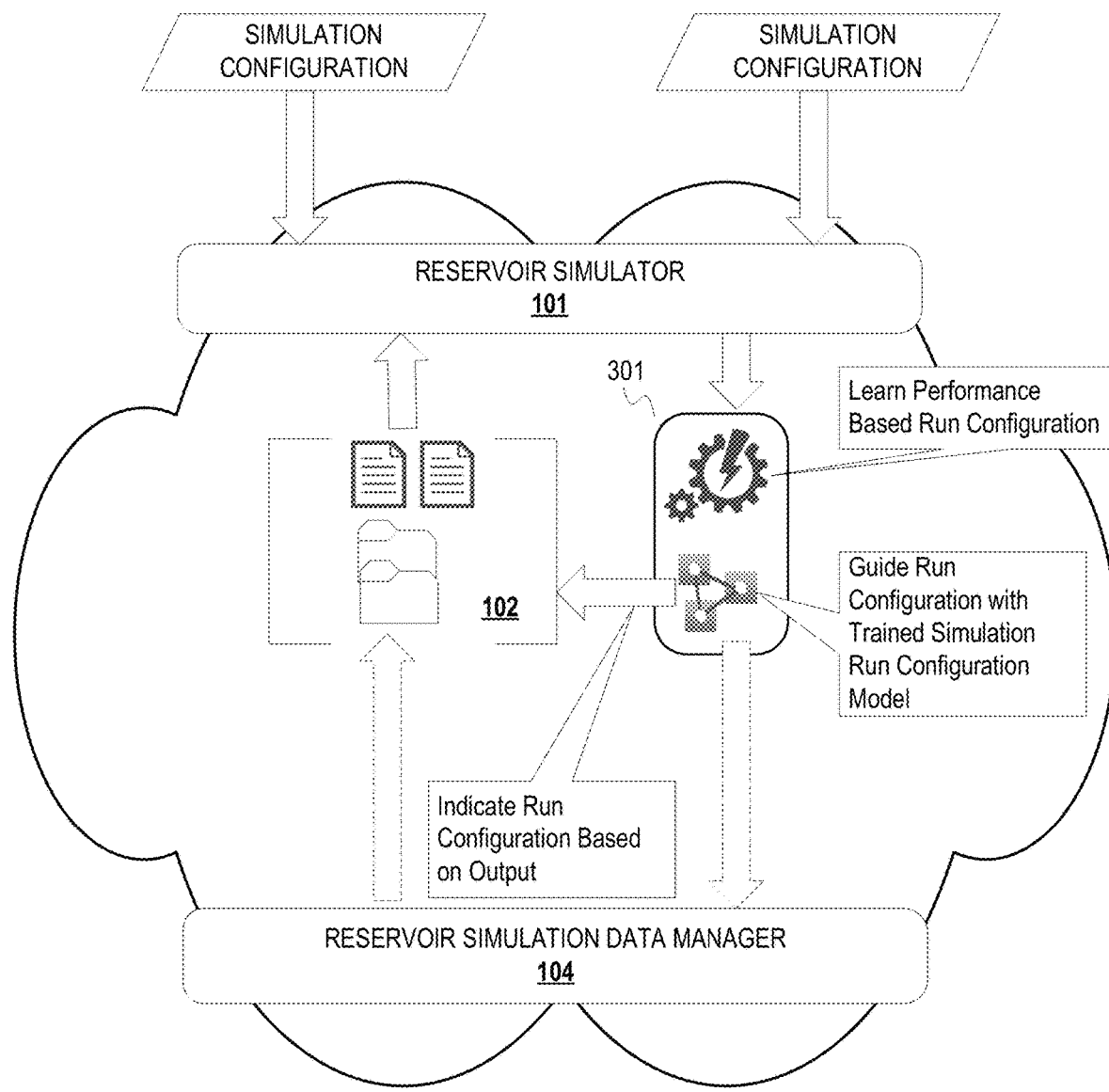
FIG. 3 is a conceptual diagram illustrating a machine learning component integrated or interacting with the reservoir simulation data manager and being used to aid in simulation run configuration.

FIG. 3 is a conceptual diagram illustrating a machine learning component integrated or interacting with the reservoir simulation data manager and being used to aid in simulation run configuration. A machine learning component 301 is illustrated within a control/data path between the reservoir simulator 101 and the reservoir simulation data manager 104. The machine learning component 301 includes a training algorithm and a trained predictive model. The machine learning component 301 uses the training algorithm for initial and subsequent training of the trained predictive model to learn configurations of simulation runs. The machine learning component 201 selects reservoir simulations that qualify as a source for training data based on performance statistics of simulation runs. For instance, the machine learning component 201 evaluates performance of a simulation run and then capture the configurations of that simulation run if the performance statistics satisfy a training data qualification criterion. The machine learning component 301 can be programmed or adjusted (e.g., via user interface settings) with the qualifying criterion. Training parameters, intervals, training data location, etc., can vary as briefly mentioned with respect to FIG. 2.

With the trained predictive model, the reservoir simulator 101 can interact with the data manager 104 and/or machine learning component 301 for guided simulation runs. With an explicit or implicit request for guidance, an incomplete simulation run configuration can be input into the trained predictive model (e.g., a user may only set number of wells and simulation time). The trained simulation configuration model outputs configurations (e.g., domain decomposition, number of nodes, etc.). The machine learning component 301 or the data manager 104 indicates the learned configurations to the I/O system 102 (e.g., edits a configuration file created by the simulator 101 or creates a configuration file to include in the input deck).

Figure 4:
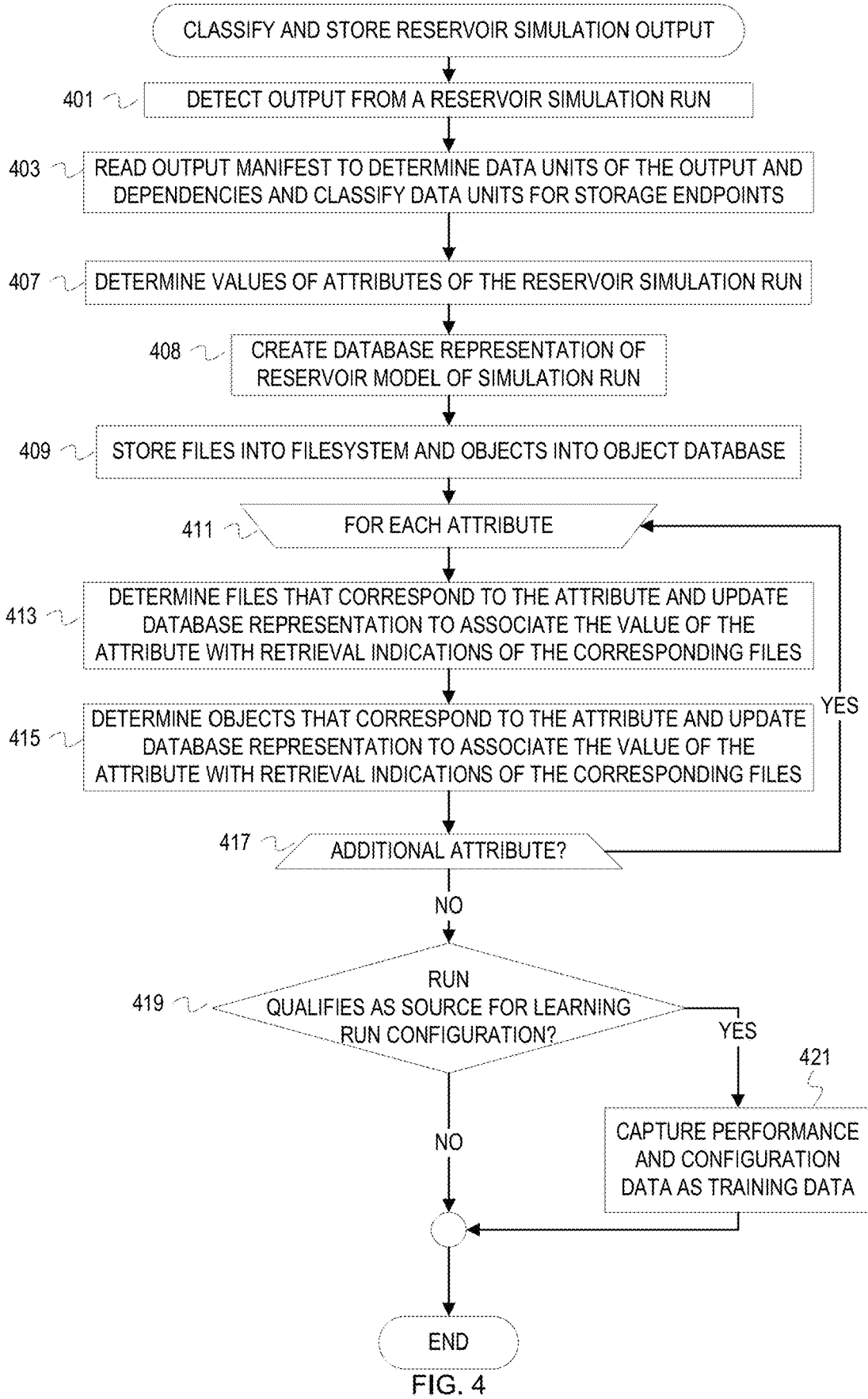
FIG. 4 is a flowchart of example operations to classify and store reservoir simulation output.
Figure 5:
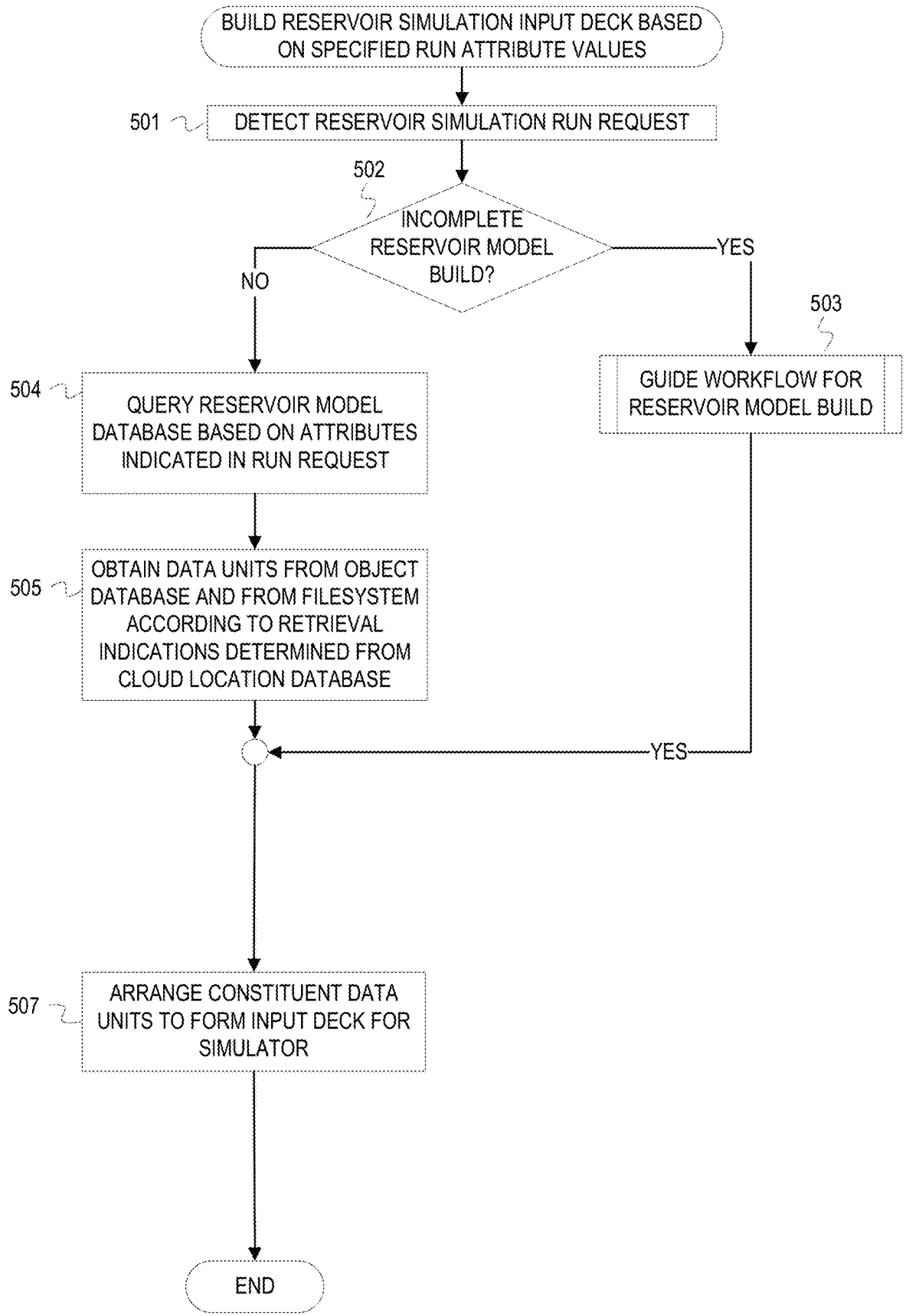
FIG. 5 is a flowchart of example operations for a data manager to build a reservoir simulation input deck based on specified run attribute values.
Figure 6:
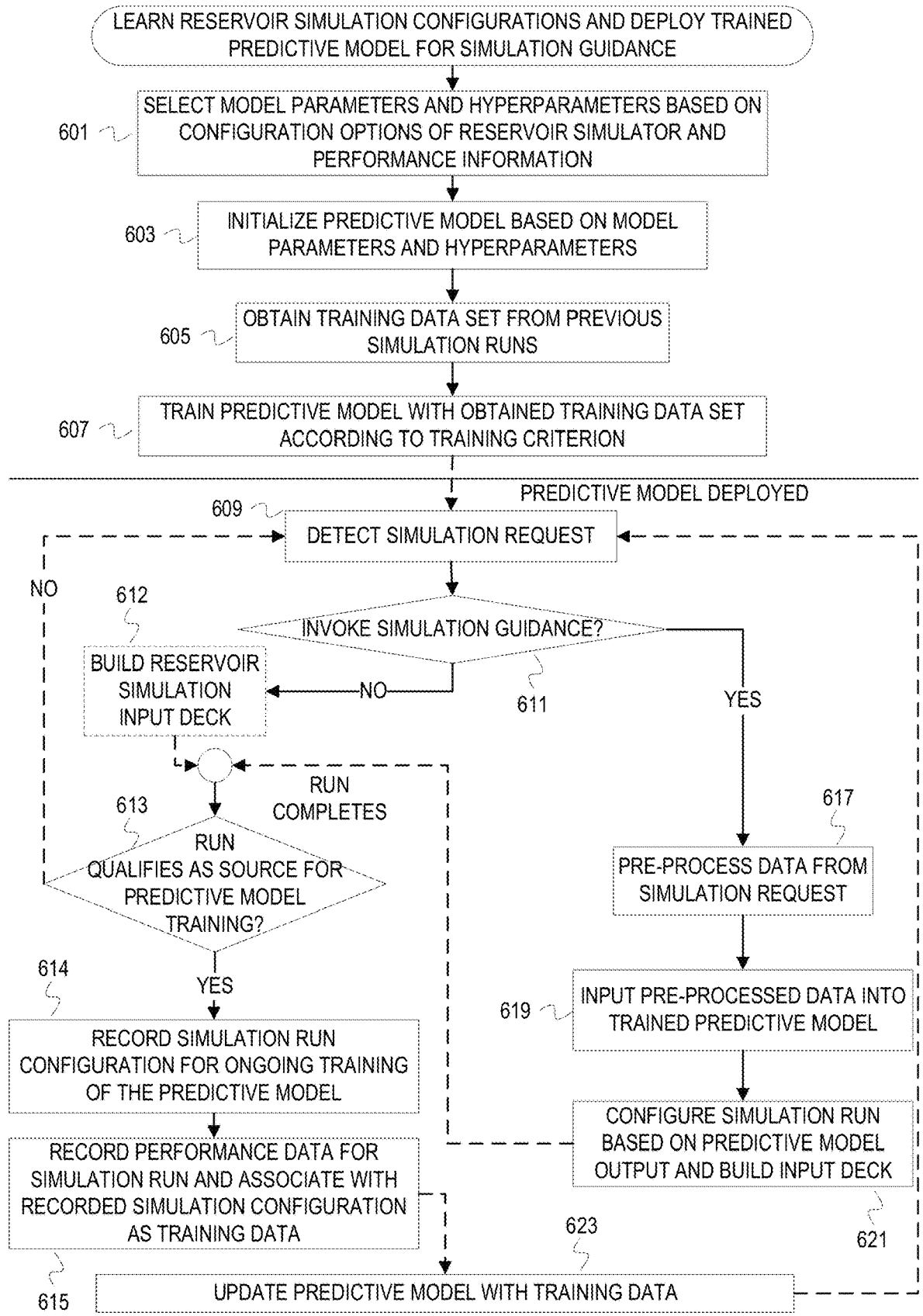
FIG. 6 is a flowchart of example operations to learn reservoir simulation configurations and deploy a trained predictive model for simulation guidance.
Figure 7:
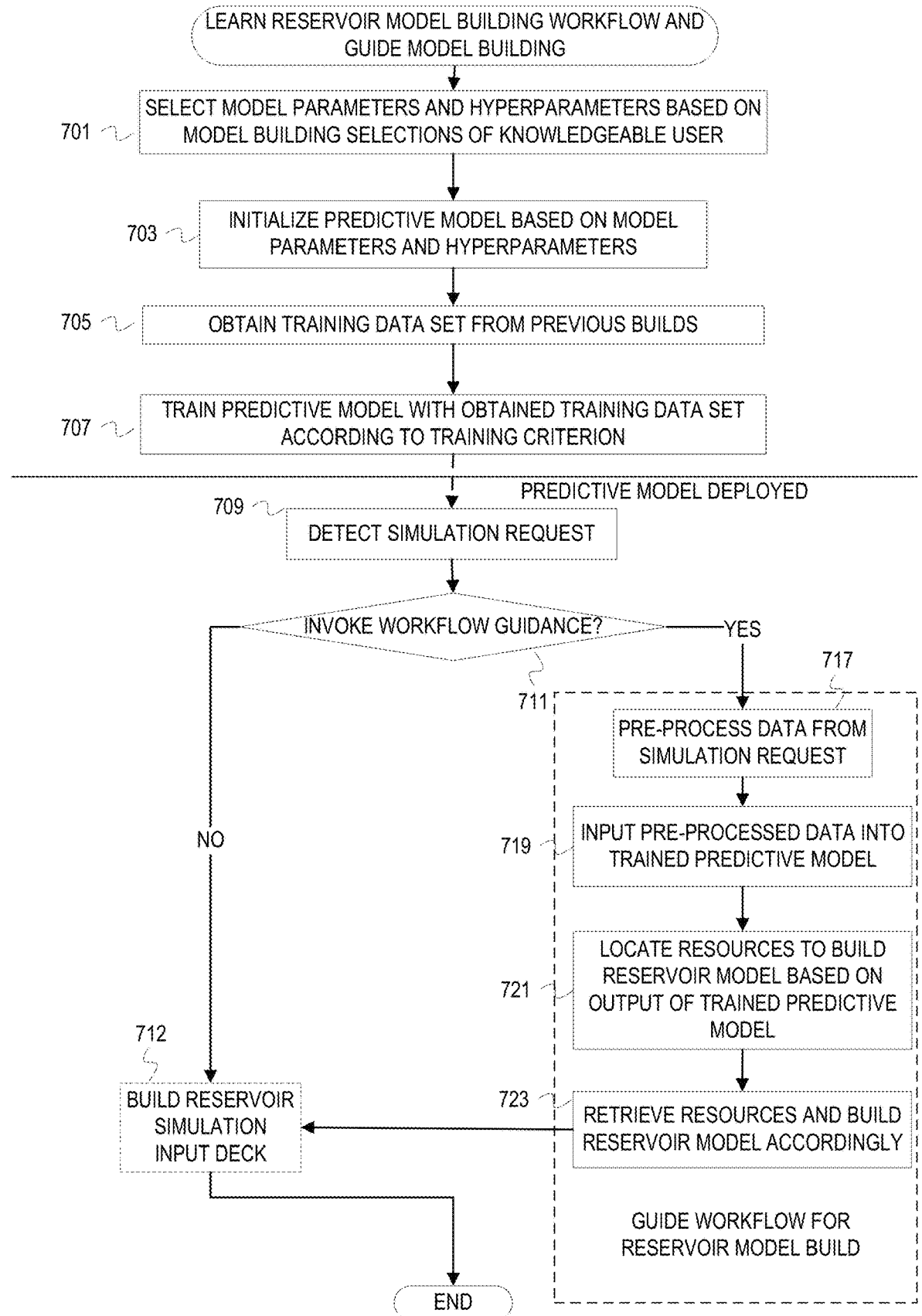
FIG. 7 is a flowchart of example operations to learn reservoir model building workflows to guide reservoir model building.

FIGS. 4-7 are flowcharts of example operations. FIGS. 4-5 describe example operations for data management that includes organizing output from a reservoir simulation run and building an input deck for a reservoir simulation run in a cloud-based environment. FIG. 6 describes example operations for training and using a predictive model to guide reservoir simulation run configuration. FIG. 7 describes example operations for training and using a predictive model for guided or assisted reservoir model building. While the descriptions of these Figures refer to a data manager, it should be understood that naming an entity to perform these operations is for convenience. Program code can be name and organized differently (e.g., depending upon platform and program code) and arbitrarily (e.g., developer preferences).

FIG. 4 is a flowchart of example operations to classify and store reservoir simulation output. The description of FIG. 4 will refer to a data manager as performing the example operations for consistency with the conceptual diagrams. The data manager presumably is cloud-based, but can run as a client application. The interactions with the storage endpoints (e.g., databases) and a reservoir simulator presume a cloud platform, thus involves an application programming interface (API) or application front-end.

At block 401, a data manager detects output from a reservoir simulation run. Due to the complexity of the simulator output (e.g., number of data units, overall size, etc.), simulators typically read from and write to an input/output system that has been programmed with capabilities suitable to serve a reservoir simulator. The data manager can monitor the simulator I/O system (e.g., allocated memory space), subscribe to the I/O system to receive notifications, etc.

At block 403, the data manager reads an output manifest (sometimes referred to as a case file) to determine data units that constitute the output ("constituent data units") and to determine dependencies among the data units. The output manifest is included as part of the output or associated with the output. The data manager also reads the output manifest to classify the data units for storage to the storage endpoints. The data manager classifies data units into filesystem type data units and objects. Data units classified as filesystem type data units or files will be stored into a storage endpoint that is a filesystem. Data units classified as objects will be stored into a storage endpoint that is an object database. The data manager reads extensions of the data unit names to classify the data units. The output manifest may also include a descriptor in association with each data unit name/identifier. The data manager can classify data units based on these descriptors. In addition, the data manager can parse the data units and classify the data units based on tokens or keywords within. The classifying operations can be prioritized. For example, the data manager would first classify based on extensions, then descriptors, and then parse those remaining data units that have yet to be classified.

At block 407, the data manager determines values of attributes of the reservoir simulation run. As mentioned earlier, a reservoir simulation run has attributes that allow for different aspects of a reservoir simulation run to be reused in different combinations or with new aspects. For example, the data manager determines grid dimensions, fluid properties, rock properties, and well configurations specified for the reservoir simulation run. The data manager can aggregate the values of these attributes and use the aggregate of the values as a mapping index to the corresponding constituent data units stored in the filesystem and the object database. As these attributes are often formed with maps or multi-dimensional arrays of values, the set of values for an attribute can be identified with a keyword or identifier that uniquely corresponds to the set of values for an attribute. For example, a set of rock properties for simulation run can be mapped to a geographic location identifier and date. As another example, the data manager can generate a hash value from a set of attribute values and use the hash value as an identifier/value that uniquely identifies the set of attribute values. The remainder of the description refers to a keyword or a identifier of a specific attribute value(s) as an attribute value. The data manager can also organize the constituent data unit by correspondence with individual ones of the attributes. The remaining operations presume the data manager organizes constituent data units by individual reservoir simulation run attributes.

At block 408, the data manager creates a database representation of the reservoir model of the simulation run. To create the database representation, the data manager updates a reservoir model representation database (e.g., relational database) to indicate the simulation run and its attributes. The reservoir model representation can have a table or node in the relational database for each attribute that further details that attribute. For instance, a first table will identify the simulation run and include an entry for each attribute. Each attribute entry will reference a table for that attribute. The attribute table will indicate the value for the attribute (e.g., a fluid model attribute will indicate black oil for the attribute value).

At block 409, the data manager stores files into the filesystem and objects into the object database. The constituent data units classified for storage into the filesystem (e.g., a high-performance, distributed parallel filesystem) are files and the constituent data units classified for storage into the object database are objects (e.g., user defined data structures output by the reservoir simulator). The data manager stores these constituent data units by invoking methods or functions defined by an interface (e.g., API) for a cloud-based storage endpoint.

At block 411, the data manager begins a loop of operations for each attribute of the reservoir simulation run. The loop of operations includes the example operations represented by blocks 413 and 415.

At 413, the data manager determines the files that correspond to the attribute of the current iteration and updates the reservoir model representation database to associate the value of the attribute with retrieval indications of the corresponding files. The retrieval indication (e.g., parameter or return value) corresponding to storing a file into a storage endpoint is mapped to the attribute value in the location database. For example, the table/node corresponding to the fluid attribute would indicate the location of the black oil fluid data file(s). To determine correspondence between the file and the attribute, the data manager can leverage the information gained from reading the output manifest. If the attribute is rock properties, then the data manager would determine from the output manifest which of the constituent data units of filesystem type correspond to rock properties. This can be done based on naming convention or detection of a keyword that corresponds to rock properties when parsing the data units.

At block 415, the data manager performs a similar operation on the objects as done for the files. The data manager determines the objects that correspond to the attribute of the current iteration and updates the corresponding entry in the reservoir model representation database to associate the value of the attribute with retrieval indications of the corresponding objects.

At block 417, the data manager determines whether there is an additional attribute that defines the reservoir simulation run. If so, operational flow returns to block 411. Otherwise, operational flow continues to block 419.

At block 419, the data manager determines whether the reservoir simulation run qualifies as a source for predictive model training. A reservoir simulation run can qualify as a source for predictive model training for simulation configuration guidance if performance data about the reservoir simulation run satisfies a set of one or more training data criteria. As an example, training data criteria can specify a minimal level of performance and successful completion to qualify. If the run does not qualify as a source for training data, then the process ends.

If the run qualifies as a source for training data, then operational flow continues to block 421. At block 421, the data manager captures reservoir model performance data and simulation configuration data of the simulation run as training data. The data manager stores the performance and configuration data of the simulation run into a training dataset database (e.g., flat file database). Examples of the reservoir model performance data include model size, rock/fluid type, time stepping approach (fully implicit method (FIM) or implicit pressure, explicit saturation (IMPES) method), simulation time, porosity type, solvers, tolerances, performance statistics, well performance data, and cloud settings. Examples of the simulation run configuration data include solver parameters (e.g., solver type(s) and settings), auto-tuning parameters, input data vetting/quality control inputs, domain decomposition for parallel computing, and performance statistics. The captured performance statistics can be aggregated across different teams (e.g., different customers), in which case the performance statistics may be anonymized. Depending upon the type of data, the data manager may normalize and/or dimensionally reduce the captured data before storing. For example, the data manager may use smaller dimension values that correlate to relative permeability ("relperm") curves to represent the relperm curves. As another example, the data manager may use endpoints to represent a gradient instead of an array or series of values that form the gradient. The gradient can use similar techniques to determine attribute values when organizing the constituent data units.

FIG. 5 is a flowchart of example operations for a data manager to build a reservoir simulation input deck based on specified run attribute values. At block 501, a data manager detects a reservoir simulation request. A user interface of a reservoir simulator will receive user selections or indications to configure and run a reservoir simulation. The reservoir simulator will convey these selections/indications to the data manager. The reservoir simulator may be modified (e.g., with wrapping code) to allow for incomplete configurations of a run to allow for use of a trained predictive model to guide completion of the run configuration.

At block 503, the data manager determines whether the reservoir simulation run request indicates an incomplete reservoir model build. If the request indicates an incomplete model build for the simulation, then operational flow continues to block 503 for guided workflow to build the reservoir model. Example operations for block 503 are described with reference to FIG. 7. After the guided model build workflow, operational flow continues to block 507. If the run request indicates a complete reservoir model build, then operational flow continues to block 504.

At block 504, the data manager queries a database of reservoir model representations based on attributes indicated in the reservoir simulation run request. The data manager may submit a request for each attribute specified in the run request and locate data units to accordingly to build an input deck. For instance, the data manager queries the location database with the grid value(s), rock and fluid value(s), and a run specification value. In response, the database returns retrieval indications (e.g., keys or indexes) that the data manager can use as arguments or parameters in an API defined function, for example, to retrieve the files and objects from cloud storage.

At block 505, the data manager obtains data units from an object database and from a filesystem according to the retrieval indications returned from the database. For instance, the data manager populates one or more requests to the object database (e.g., REST API, command line interface) and one or more requests to the filesystem with the retrieval indications.

At block 507, the data manager arranges the obtained constituent data units to form an input deck for the simulator. The data manager arranges the obtained data units in a simulator I/O system for reading by the simulator.

FIG. 6 is a flowchart of example operations to learn reservoir simulation configurations and deploy a trained predictive model for simulation guidance. The example operations encompass training a predictive model, use of the trained predictive model, and continued updating of the trained predictive model. Dashed lines represent asynchronous operational behavior, for example waiting on results or completion of an operation by another actor.

At block 601, a data manager or training component associated with the data manager selects model parameters or fitted parameters and hyperparameters of a predictive model. The data manager sets the model parameters and hyperparameters based on the configuration options of a reservoir simulator and performance information. For example, the data manager can set the number of input nodes to 10 if the input parameters include model size, rock/fluid type, time stepping approach, simulation time, porosity type, solvers, tolerances, performance statistics, well performance data, and cloud settings. The data manager can set the number of output nodes to 4 if the parameters to be predicted include number of processes, domain decomposition, load balance, and node allocation.

At block 603, the data manager initializes the predictive model based on the parameters and hyperparameters. For instance, the data manager invokes a library defined call for instantiating a deep neural network with the selected model parameters and hyperparameters.

At block 605, the data manager obtains a training data set from previous simulation runs. The training data set can be a labeled training data set that is synthetically created or curated from historical simulation runs. The data manager may choose from different training data sets defined for different types of predictive models (e.g., a training data set to train a regression model or a neural network model). The labeled training data set can be built from qualifying simulations as mentioned previously. As an example, a criterion may specify that a reservoir simulation run qualifies if a characteristic of a user that ran/configured the reservoir simulation indicates experience or possession of expert domain knowledge. A list of user identifiers or access roles can explicitly or implicitly indicate the suitable experience or knowledge.

At block 607, the data manager trains the predictive model with the obtained training data set according to a training criterion. The data manager executes a training algorithm with arguments or parameters that define when training has completed (e.g., number of iterations, convergence criteria, etc.).

After generating a trained predictive model for guiding simulation run configurations, the trained predictive model is deployed for use. Deployment can involve setting a simulator configuration or data manager configuration to load the trained predictive model into memory. Deployment can be installing the trained predictive model or an invocation of the trained predictive model in an execution path of the data manager.

At block 609, the data manager detects a simulation request. The data manager may receive a notification or message from the simulator or detect a simulation request at a monitored memory location.

At block 611, the data manager determines whether simulation guidance is to be invoked. The data manager can be programmed to determine that simulation guidance should be invoked based on different criteria and/or user input (e.g., an explicit request for guidance). For example, the data manager can be programmed to evaluate the simulation input request to determine whether the configuration is incomplete. The cell size may not be set, a number of nodes may not be set, etc. Or the request can be an "empty" request with no more than default values populated. If simulation guidance is not to be invoked, then operational flow of the data manager continues to block 612. At block 612, the data manager builds an input deck according to the request. The example operations of blocks 504, 505, and 507 of FIG. 5 are example operations for the data manager to build the input deck. If simulation guidance is to be invoked, then operational flow continues to block 617.

At block 617, the data manager pre-processes data from the simulation request. This pre-processing extracts and/or prepares parameter values, settings, etc. indicated in the simulation request for input into the trained predictive model. The data manager will have programmed the expected input parameters for the trained predictive model. For those absent from the simulation request, the data manager can use defined default values.

At block 619, the data manager inputs the pre-processed data into the trained predictive model. The data manager has determined the input parameters for the trained predictive model and calls/executes a library defined or API defined function to execute the trained predictive model with the determined inputs.

At block 621, the data manager configures a simulation run based on output from the trained predictive model and the simulation request. The data manager also builds an input deck based, at least partly, on the output from the trained predictive model. The data manager can be programmed to override simulation run configurations indicated by simulation request if there is a conflict with an output of the trained predictive model.

After the simulation run completes (either after block 610 or after block 621), the data manager determines whether the simulation run qualifies as a source for predictive model training at block 613. Qualifying criteria will vary by implementation depending upon preference(s), organization requirements, etc. Examples of a qualifying criterion include amount of time to run the simulation, user rating of the simulation run, and history matching threshold. If the simulation run does not qualify, then operational flow returns to block 609 asynchronously.

If the simulation run qualifies, then the data manager records the simulation run configuration for ongoing training of the predictive model for simulation guidance at block 614. As noted earlier, the simulation run configuration can include number of allocated nodes, domain decomposition, load balancing settings, etc.

At block 415, the data manager records the performance data for the simulation run. The data manager associates the recorded performance data and configuration data as training data. This information can be recorded into a flat file database hosted in cloud storage to allow accumulation of training data across different teams and/or organizations.

At block 623, the data manager can further train the trained predictive model with the recorded training data. The data manager likely builds up or accumulates training data from multiple simulation runs that each qualify as a training data source. Supplemental training intervals can be set based on time, simulation runs, and/or manual requests.

FIG. 7 is a flowchart of example operations to learn reservoir model building workflows to guide reservoir model building. The example operations encompass training a predictive model and use of the trained predictive model. Dashed lines represent asynchronous operational behavior, for example waiting on results or completion of an operation by another actor.

At block 701, a data manager or training component associated with the data manager selects model parameters or fitted parameters and hyperparameters of a predictive model. The data manager sets the model parameters and hyperparameters based on the available options/selections for reservoir model building.

At block 703, the data manager initializes the predictive model based on the parameters and hyperparameters. The function or library invoked can vary by chosen predictive model type.

At block 705, the data manager obtains a training data set from previous reservoir model builds. The training data set can be a labeled training data set that has been collected from reservoir model builds by experienced/expert users. As an example, a training data selection criterion may specify that a reservoir simulation run qualifies if a characteristic of a user that ran/configured the reservoir simulation indicates experience or possession of expert domain knowledge. A list of user identifiers or access roles can explicitly or implicitly indicate the suitable experience or knowledge.

At block 707, the data manager trains the predictive model with the obtained training data set according to a training criterion. The data manager executes a training algorithm with arguments or parameters that define when training has completed (e.g., number of iterations, convergence criteria, etc.).

After generating a trained predictive model for guiding reservoir model builds, the trained predictive model is deployed for use. Deployment can involve setting a simulator configuration or data manager configuration to load the trained predictive model into memory. Deployment can be installing the trained predictive model or an invocation of the trained predictive model in an execution path of the data manager.

At block 709, the data manager detects a simulation request. The data manager may receive a notification or message from the simulator or detect a simulation request at a monitored memory location. The example operations of blocks 717 and 719 are similar to those of blocks 617 and 619.

At block 711, the data manager determines whether model build workflow guidance is to be invoked. The data manager can be programmed to determine that model build workflow guidance should be invoked based on different criteria and/or user input (e.g., an explicit request for guidance). For example, the data manager can be programmed to evaluate the simulation input request to determine whether the reservoir model build is incomplete. A porosity type or calculation technique may not be set. If model build workflow guidance is not to be invoked, then operational flow of the data manager continues to block 712, which would be similar to the example operation of block 612. If model build workflow guidance is to be invoked, then operational flow continues to block 717.

At block 717, the data manager pre-processes data from the simulation request. This pre-processing extracts and/or prepares parameter values, settings, etc. indicated in the simulation request for input into the trained predictive model. The data manager will have programmed the expected input parameters for the trained predictive model. For those absent from the simulation request, the data manager can use defined default values.

At block 719, the data manager inputs the pre-processed data into the trained predictive model. The data manager has determined the input parameters for the trained predictive model and calls/executes a library defined or API defined function to execute the trained predictive model with the determined inputs.

At block 721, the data manager retrieves resources to build the reservoir model based on output of the trained predictive model. For example, the predictive model output can include which technique to choose for calculating relative permeability. The data manager would then access the reservoir model representation database with a query on a ROCK table/node for the specified file that corresponds to the chosen calculation technique.

At block 723, the data manager retrieves the resources from the filesystem or object database and builds the reservoir model based on the output of the trained predictive model for model building and any relevant user input selections for the model build. Operational flow continues to block 712.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 413 and 415 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
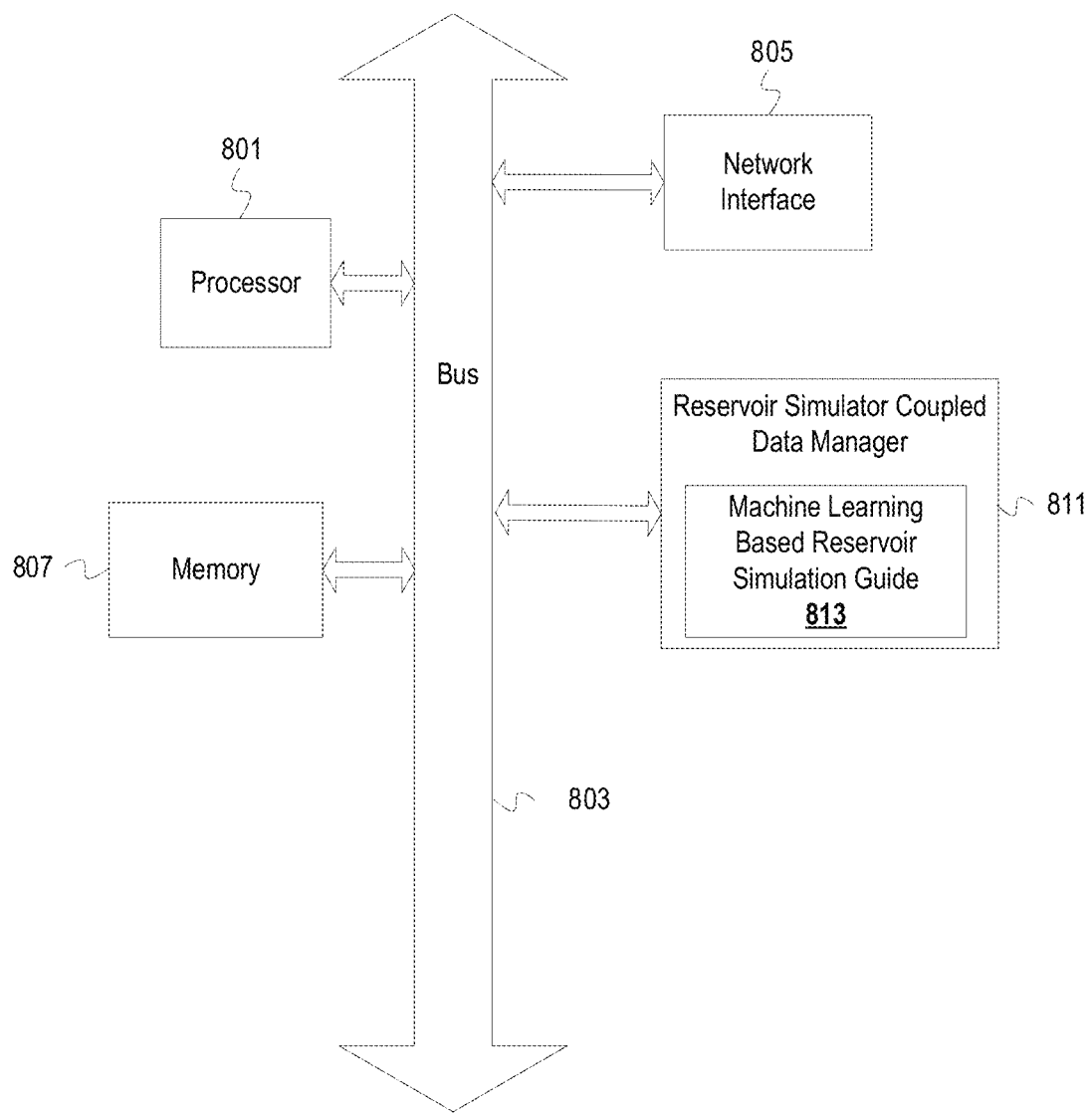
FIG. 8 depicts an example computer system with a reservoir simulator coupled data manager.

FIG. 8 depicts an example computer system with a reservoir simulator coupled data manager. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system communicates via transmissions to and/or from remote devices via the network interface 805 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes a reservoir simulator coupled data manager 811. The reservoir simulator coupled data manager 811 produces input decks for a reservoir simulator and organizes and stores reservoir simulator output across multiple cloud-based storage endpoints for efficient access and reuse by distributed teams. The reservoir simulator coupled data manager 811 organizes and stores reservoir simulator output by reservoir simulation run attributes as described above. In addition, the reservoir simulator coupled data manager 811 includes a machine learning based reservoir simulation guide 813. The reservoir simulator coupled data manager 811 captures training data from qualifying simulation runs of the reservoir simulator. The machine learning based simulation guide 813 includes a trained predictive model (e.g., a regression model, a neural network, a deep neural network, a stacked model, etc.). The machine learning based simulation guide 813 provides the trained predictive model to present a configuration(s) for a simulation run based on learning from the training data captured by the data manager 811. for Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

Figure 9:
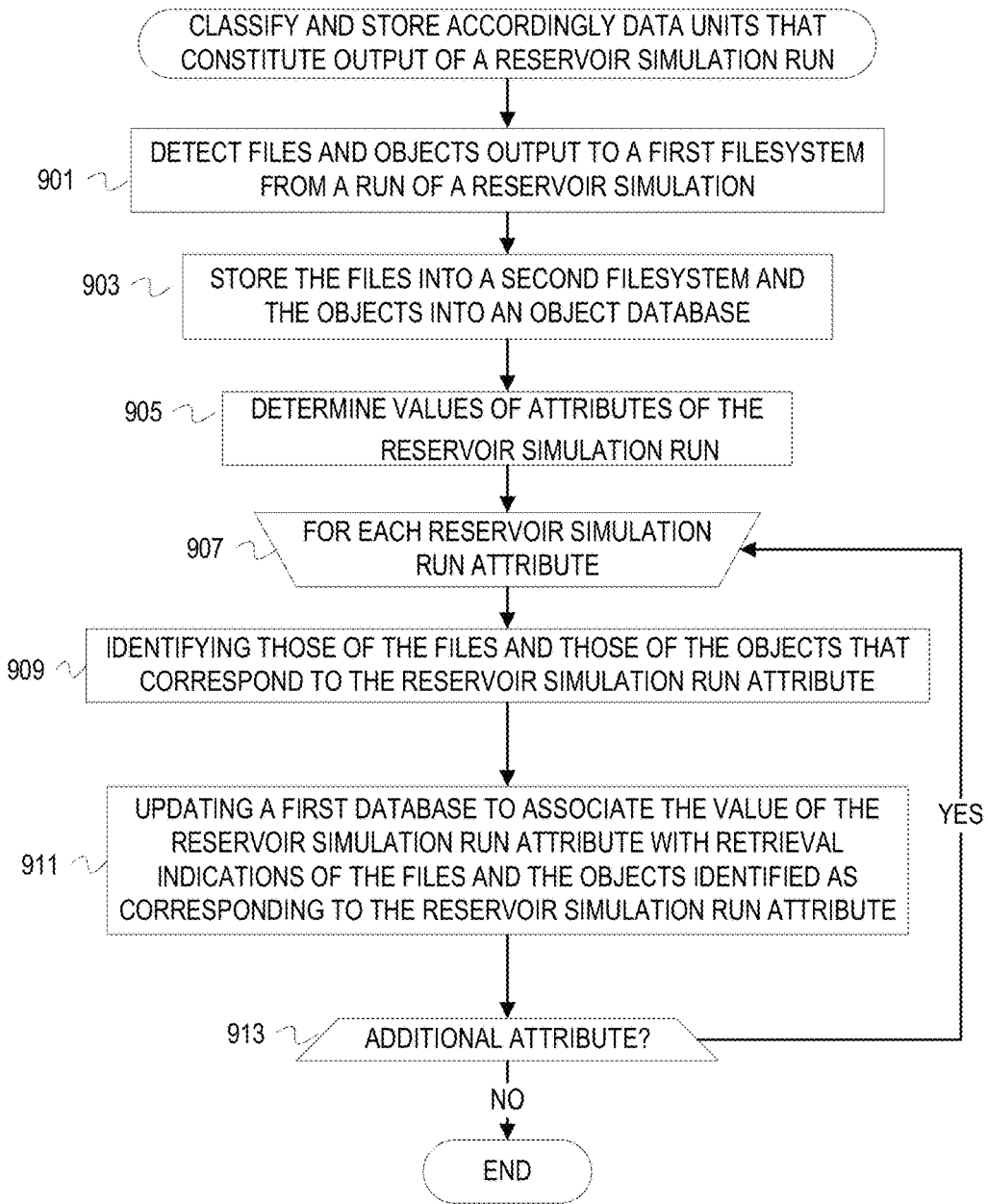
FIG. 9 is a flowchart of example operations for classifying and storing according to that classification data units that constitute output of a reservoir simulation run.
Figure 10:
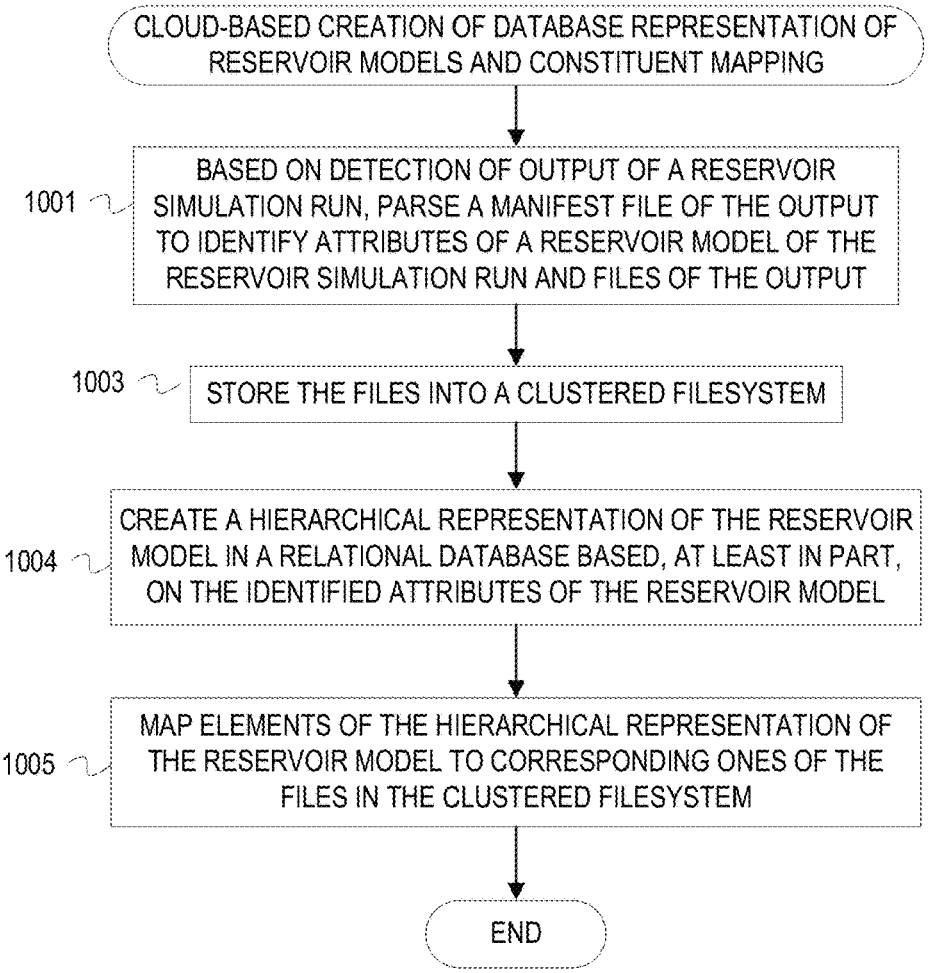
FIG. 10 is a flowchart of example operations for cloud-based creation of a database representation of reservoir models and constituent data mapping.

FIGS. 9-10 are flowcharts that disclose the present technology in broader/distinct terminology as an attempt to account for the shortcoming of language to describe novel technology. For instance, the term "neural network" is used to generically refer to a model for estimation of property values regardless of internal architecture or model type. These flowcharts do not refer to a specific actor since there are numerous implementations for organizing and developing program code, as well as various choices for deployment on different hardware and/or virtualization.

FIG. 9 is a flowchart of example operations for classifying and storing according to that classification data units that constitute output of a reservoir simulation run. At block 901, files and objects are detected in output to a first filesystem from a run of a reservoir simulation. The first filesystem is a filesystem programmed with capabilities suitable for a reservoir simulator to write to and read from. At block 903, the detected files are stored in a second filesystem and the objects into an object database. The second filesystem and object database are cloud-based. At block 905, values of attributes of the reservoir simulation run are determined. At block 907, a loop of operations is run for each reservoir simulation run attribute. The loop of operations includes blocks 909 and 911. At block 909, those of the files and those of the objects that correspond o the reservoir simulation run attribute of the current iteration are identified. At block 911, a first database is updated to associate the value of the reservoir simulation run attribute with retrieval indications of the files and the objects identified as corresponding to the reservoir simulation run attribute.

FIG. 10 is a flowchart of example operations for cloud-based creation of a database representation of reservoir models and constituent data mapping. At block 1001, a manifest file is parsed to identify attributes of a reservoir model of a reservoir simulation run and to identify files of the reservoir simulation run. The manifest file is of the output of the reservoir simulation run. The parsing is based on detection of output of the reservoir simulation run. At block 1003, the identified files are stored into a clustered filesystem. At block 1004, a hierarchical representation of the reservoir model is created in a relational database. The hierarchical representation is created based, at least in part, on the identified attributes of the reservoir model. At block 1005, elements of the hierarchical representation of the reservoir model are mapped to corresponding ones of the files in the clustered filesystem.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment 1: A method comprising detecting files and objects output to a first filesystem from a run of a reservoir simulation; storing the files into a second filesystem and the objects into an object database; determining values of attributes of the reservoir simulation run; and for each reservoir simulation run attribute, identifying those of the files and those of the objects that correspond to the reservoir simulation run attribute, and updating a first database to associate the value of the reservoir simulation run attribute with retrieval indications of the files and the objects identified as corresponding to the reservoir simulation run attribute.

Embodiment 2: The method of Embodiment 1 further comprising capturing, into a second database, performance and configuration data about the reservoir simulation run as predictive model training data.

Embodiment 3: The method of Embodiment 2, wherein the second database is a flat file database.

Embodiment 4: The method of any of Embodiments 2-3 further comprising training a predictive model with performance and configuration data stored into the second database from multiple reservoir simulation runs, wherein the predictive model is trained to output reservoir simulation run configurations.

Embodiment 5: The method of any of Embodiments 2-4 further comprising determining that the run of the reservoir simulation qualifies as a source for predictive model training data, wherein capturing the performance and configuration data about the reservoir simulation run as predictive model training data is based, at least partly, on determining that the run of the reservoir simulation qualifies as a source for predictive model training.

Embodiment 6: The method of any of Embodiments 1-5 further comprising: based on a determination that a configuration to run a reservoir simulation is incomplete, presenting constraint parameters corresponding to at least one of a configuration parameter and a performance parameter for a simulation run; inputting into a trained predictive model a selected set of one or more of the constraint parameters; and generating a reservoir simulation run request based on output of the trained predictive model.

Embodiment 7: The method of any of Embodiments 1-6, wherein storing the files into a second filesystem and the objects into an object database comprises is via one or more interfaces to one or more cloud storage services.

Embodiment 8: The method of any of Embodiments 1-7, wherein the second filesystem is a high-performance, distributed filesystem.

Embodiment 9: The method of any of Embodiments 1-8, wherein the attributes of the reservoir simulation at least comprise simulation project, simulation study, and reservoir model.

Embodiment 10: The method of any of Embodiments 1-9 further comprising determining dependencies among the files and dependencies among the objects, wherein storing the files into the second filesystem and the objects into the object database is based, at least partly, on the determined dependencies.

Embodiment 11: One or more non-transitory machine-readable media comprising program code to: based on detection of output of a reservoir simulation run, parse a manifest file of the output to identify attributes of a reservoir model of the reservoir simulation run and files of the output; store the files into a clustered filesystem; create a hierarchical representation of the reservoir model in a relational database based, at least in part, on the identified attributes of the reservoir model; and map elements of the hierarchical representation of the reservoir model to corresponding ones of the files in the clustered filesystem.

Embodiment 12: The machine-readable media of Embodiment 11, further comprising program code to: determine whether performance data of the reservoir simulation run satisfies a performance criterion; and based on a determination that the performance data satisfies the performance criterion, recording configurations of the reservoir simulation run and the performance data as training data to train a predictive model to output reservoir simulation configurations.

Embodiment 13: The machine-readable media of any of Embodiments 11-12, wherein the program code to create a hierarchical representation of the reservoir model in a relational database based, at least in part, on the identified attributes of the reservoir model comprises program code to create a first node that indicates the reservoir simulation run and the attributes of the reservoir model, a second node that represents a first of the attributes of the reservoir model and indicates a value of the first attribute, and a third node that represents a second of the attributes of the reservoir model and indicates a value of the second attribute.

Embodiment 14: The machine-readable media of Embodiment 13, wherein the program code to map elements of the hierarchical representation of the reservoir model to corresponding ones of the files in the clustered filesystem comprises program code to indicate in the second node a location in the clustered filesystem of a first file that corresponds to the value of the first attribute.

Embodiment 15: The machine-readable media of any of Embodiments 11-14 further comprising program code to: determine whether a user characteristic associated with building the reservoir model satisfies a knowledge criterion; and based on a determination that the user characteristic satisfies the knowledge criterion, record workflow for building the reservoir model as training data to train a predictive model to output selections for building the reservoir model.

Embodiment 16: The machine-readable media of any of Embodiments 11-15 further comprising program code to: based on detection of the output of a reservoir simulation run, parse the manifest file of the output to also identify objects of the output; and store the objects into an object database.

Embodiment 17: The machine-readable media of Embodiment 16, further comprising program code to map elements of the hierarchical representation of the reservoir model to corresponding ones of the objects in the object database.

Embodiment 18: An apparatus comprising: a processor; and a machine-readable medium having program code executable by the processor to cause the apparatus to, detect files and objects output to a first filesystem from a run of a reservoir simulation; store the files into a second filesystem and the objects into an object database; determine values of attributes of the reservoir simulation run; and for each reservoir simulation run attribute, identify those of the files and those of the objects that correspond to the reservoir simulation run attribute; and update a first database to associate the value of the reservoir simulation run attribute with retrieval indications of the files and the objects identified as corresponding to the reservoir simulation run attribute.

Embodiment 19: The apparatus of Embodiment 18, wherein the attributes of the reservoir simulation run correspond to rock properties, fluid properties, and temperature related properties.

Embodiment 20: The apparatus of Embodiment 18 or 19, wherein the machine-readable medium further has program code executable by the processor to cause the apparatus to: input a partial reservoir simulation run configuration into a first trained predictive model to obtain configuration to complete the reservoir simulation configuration; and invoke a guided workflow for reservoir model building which obtains selections for building a reservoir model for the run of the reservoir simulation from a second trained predictive model.

What is claimed is:

1. A method comprising:
   detecting, by a computerized data manager, files and objects output to a first computer filesystem from a run of a computerized reservoir simulation;
   storing the files into a second computer filesystem and the objects into an object database;
   determining values of attributes of the reservoir simulation run for each reservoir simulation run attribute,
      identifying those of the files and those of the objects that correspond to the reservoir simulation run attribute; and
      updating a first database to associate the value of the reservoir simulation run attribute with retrieval indications of the files and the objects identified as corresponding to the reservoir simulation run attribute;
   capturing performance and configuration data about the reservoir simulation run as predictive model training data;
   determining, from properties of each of the files, a frequency of changes to each file;
   determining whether the frequency of changes to each file exceeds a file change frequency threshold; and
   storing any files having a frequency of changes exceeding the file change frequency threshold in a second database.

2. The method of claim 1 further comprising aggregating the values of the attributes and using the aggregate of the values as a mapping index to corresponding data stored in the second computer filesystem and corresponding objects stored in the object database.

3. The method of claim 1, wherein the second database is a flat file database.

4. The method of claim 1 further comprising training a predictive model with performance and configuration data stored into the second database from multiple reservoir simulation runs, wherein the predictive model is trained to output reservoir simulation run configurations.

5. The method of claim 1 further comprising determining that the run of the reservoir simulation qualifies as a source for predictive model training data, wherein capturing the performance and configuration data about the reservoir simulation run as predictive model training data is based, at least partly, on determining that the run of the reservoir simulation qualifies as a source for predictive model training.

6. The method of claim 1 further comprising:
   based on a determination that a configuration to run a reservoir simulation is incomplete, presenting constraint parameters corresponding to at least one of a configuration parameter and a performance parameter for a simulation run;
   inputting into a trained predictive model a selected set of one or more of the constraint parameters; and
   generating a reservoir simulation run request based on output of the trained predictive model.

7. The method of claim 1, wherein storing the files into a second computer filesystem and the objects into an object database is via one or more interfaces to one or more cloud storage services.

8. The method of claim 1, wherein the second computer filesystem is a high-performance, distributed filesystem.

9. The method of claim 1, wherein the attributes of the reservoir simulation at least comprise simulation project, simulation study, and reservoir model.

10. The method of claim 1 further comprising determining dependencies among the files and dependencies among the objects, wherein storing the files into the second computer filesystem and the objects into the object database is based, at least partly, on the determined dependencies.

11. One or more non-transitory machine-readable media comprising program code to:
   parse a manifest file of output from a computerized reservoir simulation to identify attributes of a reservoir model of the reservoir simulation run and files of the output;
   store the files into a clustered computer filesystem, wherein the clustered computer filesystem includes at least a first database and a second database;
   create a hierarchical representation of the reservoir model in a relational database based, at least in part, on the identified attributes of the reservoir model; and
   map elements of the hierarchical representation of the reservoir model to corresponding ones of the files in the clustered computer filesystem;
   capturing performance and configuration data about the reservoir simulation as predictive model training data;
   determining, from properties of each of the files of the output, a frequency of changes to each file;
   determining whether the frequency of changes to each file exceeds a file change frequency threshold; and
   storing any files having a frequency of changes exceeding the file change frequency threshold in the second database.

12. The machine-readable media of claim 11, further comprising program code to:
   determine whether performance data of the reservoir simulation run satisfies a performance criterion; and
   based on a determination that the performance data satisfies the performance criterion, recording configurations of the reservoir simulation run and the performance data as training data to train a predictive model to output reservoir simulation configurations.

13. The machine-readable media of claim 11, wherein the program code to create a hierarchical representation of the reservoir model in a relational database comprises program code to create a first node that indicates the reservoir simulation run and the attributes of the reservoir model, a second node that represents a first of the attributes of the reservoir model and indicates a value of the first attribute, and a third node that represents a second of the attributes of the reservoir model and indicates a value of the second attribute.

14. The machine-readable media of claim 13, wherein the program code to map elements of the hierarchical representation of the reservoir model to corresponding ones of the files in the clustered filesystem comprises program code to indicate in the second node a location in the clustered filesystem of a first file that corresponds to the value of the first attribute.

15. The machine-readable media of claim 11 further comprising program code to:
   determine whether a user characteristic associated with building the reservoir model satisfies a knowledge criterion; and
   based on a determination that the user characteristic satisfies the knowledge criterion, record workflow for building the reservoir model as training data to train a predictive model to output selections for building the reservoir model.

16. The machine-readable media of claim 11 further comprising program code to:
   parse the manifest file of the output of the computerizes reservoir simulation to also identify objects of the output; and
   store the objects into an object database.

17. The machine-readable media of claim 16, further comprising program code to map elements of the hierarchical representation of the reservoir model to corresponding ones of the objects in the object database.

18. An apparatus comprising:
   a processor; and
   a machine-readable medium having program code executable by the processor to cause the apparatus to,
   detect files and objects output to a first computer filesystem from a run of a computerized reservoir simulation;
   store the files into a second computer filesystem and the objects into an object database;
   determine values of attributes of the reservoir simulation run;
   for each reservoir simulation run attribute, identify those of the files and those of the objects that correspond to the reservoir simulation run attribute; and
      update a first database to associate the value of the reservoir simulation run attribute with retrieval indications of the files and the objects identified as corresponding to the reservoir simulation run attribute;
   capture performance and configuration data about the reservoir simulation run as predictive model training data;
   determine, from properties of each of the files, a frequency of changes to each file;
   determine whether the frequency of changes to each file exceeds a file change frequency threshold; and
   store any files having a frequency of changes exceeding the file change frequency threshold in a second database.

19. The apparatus of claim 18, wherein the attributes of the reservoir simulation run correspond to rock properties, fluid properties, and temperature related properties.

20. The apparatus of claim 18, wherein the machine-readable medium further has program code executable by the processor to cause the apparatus to:
   input a partial reservoir simulation run configuration into a first trained predictive model to obtain configuration to complete the reservoir simulation configuration; and
   invoke a guided workflow for reservoir model building which obtains selections for building a reservoir model for the run of the reservoir simulation from a second trained predictive model.

* * * * *